Patented Dec. 6, 1927.

1,651,737

UNITED STATES PATENT OFFICE.

OMAR H. SMITH, OF NEW YORK, N. Y., ASSIGNOR TO THE NAUGATUCK CHEMICAL COMPANY, OF NAUGATUCK, CONNECTICUT, A CORPORATION OF CONNECTICUT.

PROCESS FOR COMPOUNDING AND VULCANIZING RUBBER AND PRODUCTS OBTAINED THEREFROM.

No Drawing. Continuation of application Serial No. 574,780, filed July 13, 1922. This application filed July 6, 1925. Serial No. 41,875. Renewed May 3, 1927.

This invention relates to compounding and vulcanizing rubber. It is more particularly directed to compounding by absorption and diffusion throughout the rubber of vulcanizing ingredients and the vulcanization of the rubber, and products obtained therefrom.

This application is a continuation of the joint application of Sidney M. Cadwell and Omar H. Smith, Serial No. 574,780, filed July 13, 1922.

One of the objects of the present invention is to introduce several vulcanizing ingredients into rubber for example sheet rubber or otherwise previously shaped rubber while avoiding a change in form or other physical characteristics of the rubber and eliminating in whole or in part methods such as milling, which are expensive and which may give rise to prevulcanization when very active accelerators are used. Another object of the invention is to provide a simple method for combining ingredients with articles formed from latex which ingredients if added to the latex itself might cause difficulty through coagulation. Another object of the invention is to provide products resulting from such process having desirable physical characteristics including high tensile strength and good resistance to ageing.

It has been found in accordance with the present invention that vulcanization at ordinary temperatures, approximately 70° F. may be carried out when the four ingredients, M in combination, (where M represents zinc or other metal defined hereinafter) an amine, a material comprising sulphur, and a material comprising carbon disulphide are present. At temperatures above the ordinary temperature, say 212° F. or 240–286° F. (the temperature of normal hot vulcanization) or above vulcanization occurs at an increased rate.

The invention accordingly consists in combining with rubber four ingredients for vulcanization, namely, M in combination, an amine, a material comprising sulphur and a material comprising carbon disulphide, more than two of the substances being allowed to diffuse themselves throughout the rubber, and vulcanizing the rubber; it also includes allowing a mixture of zinc in combination, an amine, sulphur and carbon disulphide to permeate and diffuse itself throughout a sheet of rubber, and vulcanizing the rubber; it also includes products resulting therefrom.

In carrying out the invention in its preferred form, a sheet of rubber or article produced for example by dipping a form into a benzol rubber cement or rubber latex and drying, is dipped into a benzol solution containing the following substances in the proportions indicated; benzol 80 parts by weight, sulphur, 0.8 parts by weight, zinc butyl xanthogenate 4 parts by weight, dibenzyl amine 3.2 parts by weight. The rubber is allowed to remain immersed until diffusion has been accomplished. The completion of diffusion will depend upon the thickness of the rubber being treated. In the case of a surgeon's glove for example having a thickness of 1/64", diffusion occurs in 90 seconds. The rubber sheet or article which has been so treated is dried and is vulcanized by heating for 2 hrs. at 212° F. Or if desired the article may be allowed to remain at ordinary temperature for approximately one week whereupon vulcanization is secured. On the other hand if more rapid vulcanization is desired, the article may be subjected to the ordinary hot vulcanization temperature 240–286° F. for 20 minutes whereupon vulcanization is accomplished. In other words temperatures above or below the normal hot vulcanization point may be employed.

As another example a carbon tetrachloride, benzol or gasoline solution containing the following substances in the percentages by weight indicated is made up: oxy normal butyl thiocarbonic acid disulphide 3½%, dibenzyl amine 6%, zinc oxide 1%, and sulphur 1%. If rubber, for example as a sheet, or formed rubber article is dipped into this solution and allowed to remain for 90 seconds, withdrawn and dried, it may be vulcanized by heating thereafter for 2 hrs. at 212° F. or if allowed to stand one week at ordinary room temperature, approximately 70° F. or if heated at 240–286° F. for 20 minutes vulcanization is secured.

As another example a sheet of rubber or a rubber article is dipped in a chloroform, benzol or carbon tetrachloride solution containing the following ingredients in the percentages indicated: carbon disulphide 5%, dibenzylamine 6%, zinc oxide 1%, and sulphur 1%. These substances permeate the rubber and diffuse themselves throughout its mass. When diffusion is sufficiently accomplished the rubber is removed and vulcanized after drying by heating for 2 hrs. at 212° F. It may also be vulcanized at ordinary temperature, at the normal hot vulcanization temperature, or at any desired temperature.

As another example a sheet of rubber or rubber article is dipped in a chloroform, benzol or carbon tetrachloride solution containing the following ingredients in the percentages indicated: sulphur 1%, tetramethylthiurammonosulphide 2%, zinc stearate 1%, and allowed to remain for 60 seconds. The rubber upon being withdrawn and dried vulcanizes at 275° F. in 30 minutes. It vulcanizes more slowly at lower temperatures.

It will be observed that various organic solvents other than those given in the examples may be employed.

A valuable method of utilizing the active vulcanization properties of the mixture of the four ingredients given above is by milling one or more of them with rubber and then introducing the balance otherwise. If one ingredient is absent during the milling process there is no danger of prevulcanization or burning. Certain of the procedures including combining two of the four vulcanizing ingredients with the rubber and substantially without changing the form of the combination introducing the remaining vulcanizing ingredients from a medium other than rubber; as well as combining three of the four vulcanizing ingredients with rubber and substantially without changing the shape of the combination introducing the remaining vulcanizing ingredient from solution, have been described in copending application Serial No. 681,066, filed December 17, 1923.

Instead of absorbing all of the four ingredients carbon disulphide, zinc in combination, an amine and sulphur from carbon tetrachloride, benzol or other solution by diffusion as set forth above one of these ingredients may be combined with the rubber by milling or by other means as for instance by mixing with latex and the other ingredients may then be absorbed as indicated above.

*Where one ingredient is combined by a method other than absorption with the rubber.*—As an example of this process 10% by weight of zinc oxide may be combined with rubber by milling and a thin film may be treated with a chloroform, benzol or carbon tetrachloride solution containing dibenzylamine 4%, sulphur 1% and carbon disulphide 5%. The substances dibenzylamine, sulphur and carbon disulphide may be combined and then diffused or they may be applied separately to the rubber. As another example 3% of sulphur may be milled into the rubber and the rubber so treated may be dipped in a chloroform solution containing zinc butyl xanthogenate 4% and dibenzylamine 3.2%. Or the sulphur rubber combination may be treated with a chloroform solution containing carbon disulphide 5%, zinc stearate 3%, dibenzylamine 4%. As another example 3.2% of the dibenzylamine may be combined with the rubber by milling and the combination may be treated with a chloroform solution containing zinc butyl xanthogenate 4% and sulphur 1%.

After carrying out the incorporation of the ingredients vulcanization may be accomplished by heating the rubber so combined with the four ingredients to 212° F. for 2 hrs. whereupon vulcanization is accomplished or vulcanization may be carried out at ordinary temperature by allowing the rubber so combined to stand for 1 week or at 240–286° F. by allowing the rubber to stand for 20 minutes.

The following list includes substances mentioned herein containing one or more of the four ingredients which when combined with rubber vulcanize at above or below hot vulcanization temperatures:

*Physical state of components.*

| Substance. | Amine. | Carbon disulphide. | Sulphur. | Zinc in combination. |
| --- | --- | --- | --- | --- |
| Zinc butyl xanthogenate. $C_4H_9OCSZnSCOC_4H_9$ with $\underset{S}{\parallel}$ $\underset{S}{\parallel}$ (Solid—providing $CS_2$ and zinc in solid form, zinc being rubber soluble—may use in solution.) | | x | | x |
| Oxy normal butyl thiocarbonic acid disulphide. $C_4H_9OCSSCOC_4H_9$ with $\underset{S}{\parallel}$ $\underset{S}{\parallel}$ (Liquid—providing $CS_2$ and S in liquid form—may be used in solution.) | | x | x | |
| Zinc stearate (solid—may use in solution) | | | | x |
| Zinc oxide (solid—may be used in solution) | | | | x |
| Aniline (liquid or vapor) | x | | | |
| Dibenzyl amine (liquid) | x | | | |
| Para toluidine (solid—works best when incorporated in the rubber) | x | | | |
| Sulphur (solid—may be used in solution) | | | x | |
| Carbon disulphide (liquid or vapor) | | x | | |

The material listed in the left hand column provides the ingredient or ingredients heading the column or columns in which the x appears.

It will be seen by inspecting the above table that the four ingredients may be added as solids, gases or liquids. The solution of the four ingredients employing xanthogenate is more stable in the presence of aliphatic than in the presence of aromatic amines.

It will be observed that carbon disulphide is employed as such or a derivative thereof. It will be obvious that various other derivatives thereof or of carbon oxysulphide than those set forth may be used, such as those included in Patents Nos. 1,440,962, 1,440,963, 1,440,964, 1,510,652, 1,532,226 and 1,532,227 of Sidney M. Cadwell. Sulphur may be employed as such or in a compound adapted to transfer sulphur from itself to rubber under vulcanizing conditions as set forth in the Patent No. 1,559,393 of Theodore Whittelsey et al. and Patent No. 1,532,225 of Sidney M. Cadwell. Instead of sulphur various nitro compounds may be employed for hot vulcanization. Various amines may be used and in general the observations set forth in connection with amines, particularly in Patents Nos. 1,440,962, 1,440,963, 1,440,964, 1,510,652, 1,532,226 and 1,532,227 of Sidney M. Cadwell, mentioned above are applicable in connection with the present processes. Instead of using zinc the various metals set forth in Patents Nos. 1,440,962, 1,440,963, 1,440,964, 1,510,652, 1,532,226 and 1,532,227 of Sidney M. Cadwell may be employed under the conditions therein set forth. Briefly stated these metals which I have designated as M are as follows: zinc mercury, preferably in the mercuric state, lead, preferably in the plumbous state, cadmium, copper, preferably in the cupric state, arsenic, preferably in the arsenous state, manganese, preferably in the manganous state.

The process of the present invention is a simple economical one. By eliminating milling usually practiced in combining vulcanizing ingredients the expense of such milling is avoided and a better rubber product is secured. The products have greater resistance to ageing and flexing. They also have a higher tensile strength due at least in part to the absence of milling.

Materials which are ordinarily classed under the term rubber including balata, gutta percha, synthetic rubber, may be similarly employed in carrying out the invention and it is intended to include such substances by the term rubber as herein employed.

As many apparently widely different embodiments of this invention may be made without departing from the spirit thereof, it will be understood that I do not intend to limit myself to the specific embodiment herein set forth except as indicated in the appended claims.

Having thus described my invention what I claim and desire to protect by Letters Patent is:

1. A process of the kind described which comprises combining with rubber the substances M in combination, an amine, a material comprising sulphur, and a material comprising carbon disulphide, more than two of these being allowed to diffuse themselves throughout the rubber, and vulcanizing the rubber.

2. A process of the kind described which comprises combining with rubber the substances zinc in combination, an amine, a material comprising sulphur, and a material comprising carbon disulphide, more than two of these being allowed to diffuse themselves throughout the rubber, and vulcanizing the rubber.

3. A process of the kind described which comprises combining with rubber the substances zinc in combination, an amine, sulphur, and carbon disulphide, several of the substances being allowed to diffuse themselves throughout the rubber, and vulcanizing the rubber.

4. A process of the kind described which comprises combining with rubber the substances zinc in combination, an amine, a material comprising sulphur, and carbon disulphide, several of the substances being allowed to diffuse themselves throughout the rubber, and vulcanizing the rubber.

5. A process of the kind described which comprises allowing a mixture of M in combination, an amine, a material comprising sulphur, and a material comprising carbon disulphide, to diffuse itself throughout a mass of rubber, and vulcanizing the rubber.

6. A process of the kind described which comprises dipping rubber in a solution containing zinc in combination, an amine, sulphur, and a materal comprising carbon disulphide, allowing them to diffuse themselves throughout the rubber, and vulcanizing the rubber.

7. A process of the kind described which comprises combining with rubber the substances M in combination, an amine, a material comprising sulphur, and a material comprising carbon disulphide, more than two of these being allowed to diffuse themselves throughout the rubber, and vulcanizing the rubber at a temperature below the normal hot vulcanization temperature.

8. A process of the kind described which comprises combining with rubber the substances zinc in combination, an amine, sulphur, and carbon disulphide, several of the substances being allowed to diffuse themselves throughout the rubber, and vulcanizing the rubber at a temperature below the normal hot vulcanization temperature.

9. A process of the kind described which comprises allowing a mixture of M in combination, an amine, a material comprising sulphur, and a material comprising carbon disulphide, to diffuse itself throughout a mass of rubber, and vulcanizing the rubber at a temperature below the normal hot vulcanization temperature.

10. A process of the kind described which comprises dipping rubber in a solution containing zinc in combination, an amine, sulphur, and a materal comprising carbon disulphide, allowing these to diffuse themselves throughout the rubber, and vulcanizing the rubber at a temperature below the normal hot vulcanization temperature.

11. A process of the kind described which comprises combining with rubber the substances M in combination, an amine, a material comprising sulphur, and a material comprising carbon disulphide, more than two of these being allowed to diffuse themselves throughout the rubber, and vulcanizing the rubber at 70° F.

12. A process of the kind described which comprises dipping rubber in a solution containing zinc in combination, an amine, sulphur, and a material comprising carbon disulphide, allowing them to diffuse themselves throughout the rubber, and vulcanizing the rubber at 70° F.

13. A process of the kind described which comprises dipping rubber in a benzol solution of sulphur, zinc butyl xanthogenate, and dibenzyl amine, allowing the substances mentioned to diffuse themselves throughout the rubber, removing the benzol, and vulcanizing the rubber.

14. A vulcanized rubber derived from rubber combined with the substances M in combination, an amine, a material comprising sulphur, and a material comprising carbon disulphide, more than two of them being allowed to diffuse themselves throughout the rubber.

15. A vulcanized rubber derived from rubber combined with the substances zinc in combination, an amine, a material comprising sulphur, and a material comprising carbon disulphide, more than two of them being allowed to diffuse themselves throughout the rubber.

16. A vulcanized rubber derived from rubber combined with the substances zinc in combination, an amine, sulphur, and carbon disulphide, several of the substances being allowed to diffuse themselves throughout the rubber.

17. A vulcanized rubber derived from rubber combined with the substances zinc in combination, an amine, a material comprising sulphur, and carbon disulphide, several of the substances being allowed to diffuse themselves throughout the rubber.

18. A vulcanized rubber derived from rubber having diffused therethrough a mixture of M in combination, an amine, a material comprising sulphur, and a material comprising carbon disulphide.

19. A vulcanized rubber derived from rubber dipped in a solution containing zinc in combination, an amine, sulphur, and a material comprising carbon disulphide, all of these being allowed to diffuse themselves throughout the rubber.

20. A rubber vulcanized at a temperature below the normal hot vulcanization temperature derived from rubber combined with the substances M in combination, an amine, a material comprising sulphur, and a material comprising carbon disulphide, more than two of these being allowed to diffuse themselves throughout the rubber.

21. A rubber vulcanized at a temperature below the normal hot vulcanization temperature derived from rubber combined with the substances zinc in combination, an amine, sulphur, and carbon disulphide, several of the substances being allowed to diffuse themselves throughout the rubber.

22. A rubber vulcanized at a temperature below the normal hot vulcanization temperature derived from rubber having diffused therethrough a mixture of M in combination, an amine, a material comprising sulphur, and a material comprising carbon disulphide.

23. A rubber vulcanized at a temperature below the normal hot vulcanization temperature derived from rubber dipped in a solution containing zinc in combination, an amine, sulphur, and a material comprising carbon disulphide, all of these being allowed to diffuse themselves throughout the rubber.

24. A rubber vulcanized at 70° F. derived from rubber combined with the substances M in combination, an amine, a material comprising sulphur, and a material comprising carbon disulphide, more than two of these being allowed to diffuse themselves throughout the rubber.

25. A rubber vulcanized at 70° F. derived from rubber dipped in a solution containing zinc in combination, an amine, sulphur, and a material comprising carbon disulphide, all of these being allowed to diffuse themselves throughout the rubber.

26. A vulcanized rubber derived from rubber dipped in a benzol solution of sulphur, zinc butyl xanthogenate, and dibenzylamine, the substances mentioned being allowed to diffuse themselves throughout the rubber and the benzol removed.

27. The method of vulcanizing rubber, which consists in applying to the surface of a sheet or piece of rubber a compound or mixture of metallic oxide, sulphur and an organic accelerator, and then subjecting the same to a vulcanizing heat.

28. The process of vulcanizing an article of rubber, which is otherwise unvulcanizable, which consists in applying sulphur, an accelerator and an activator to the article, and subjecting the article to vulcanizing temperature.

Signed at New York, county of New York, and State of New York, this 3rd day of July, 1925.

OMAR H. SMITH.